United States Patent [19]

Luke

[11] 4,328,888
[45] May 11, 1982

[54] CONVEYOR BELT SCRAPER BLADES

[76] Inventor: Richard F. Luke, Oxcroft Works, Boughton La., Clowne, Chesterfield, England

[21] Appl. No.: 104,098

[22] Filed: Dec. 17, 1979

Related U.S. Application Data

[63] Continuation of Ser. No. 917,349, Jun. 20, 1978, abandoned.

[51] Int. Cl.³ .............................................. B65G 45/00
[52] U.S. Cl. .................................... 198/499; 15/256.5
[58] Field of Search .............. 198/497, 599, 367, 688, 198/499; 15/256.5, 250.42, 121, 256.51, 236.6

[56] References Cited

U.S. PATENT DOCUMENTS 3,994,388  11/1976  Reiter ................................... 198/499

FOREIGN PATENT DOCUMENTS 1331222  9/1973  United Kingdom ................ 198/499

Primary Examiner—Robert B. Reeves
Assistant Examiner—Douglas D. Watts
Attorney, Agent, or Firm—Trexler, Bushnell & Wolters, Ltd.

[57] ABSTRACT

A conveyor belt scraper blade, of synthetic plastics or hard rubber material and of elongate form bonded to an elongate metallic reinforcing and/or supporting strip extending parallel to the longitudinal axis of the blade, the latter having at least one longitudinally extending scraper edge, adapted, in use, to make contact with a conveyor belt surface to be scraped, and the blade having a lateral dimension such that said at least one scraper edge extends beyond an adjacent lateral periphery of the strip, the latter being apertured at at least two places along its length to provide a connection means for attaching the blade, in use, to a blade supporting arrangement.

7 Claims, 4 Drawing Figures

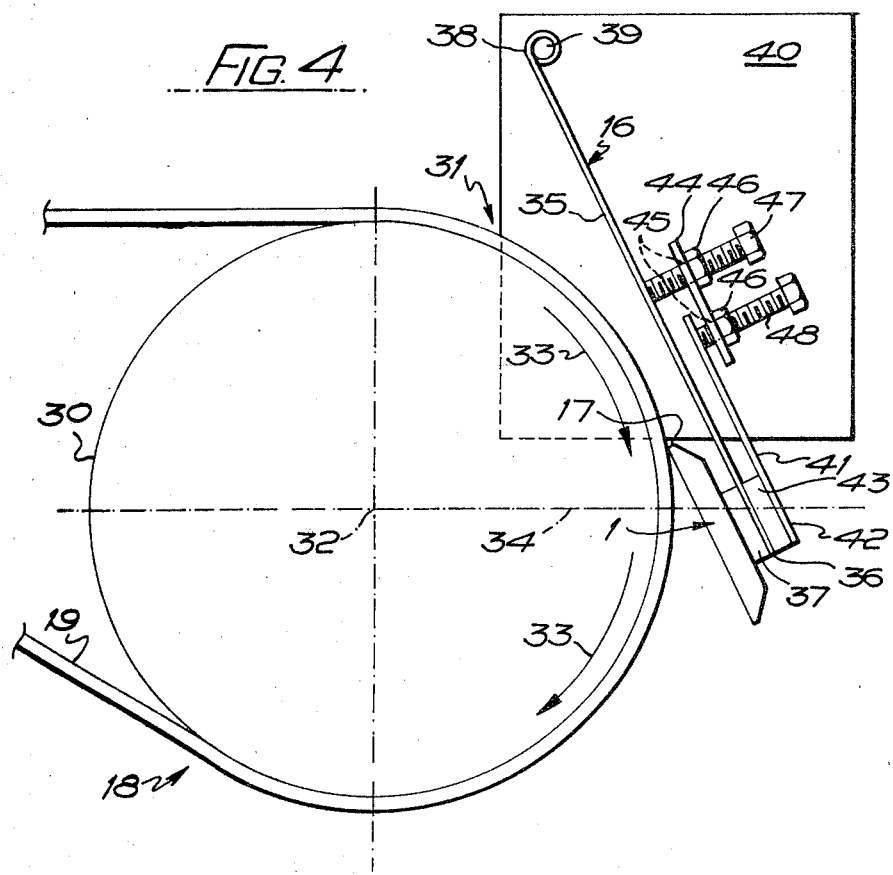

CONVEYOR BELT SCRAPER BLADES

This is a continuation of application Ser. No. 917,349, filed June 20, 1978, now abandoned.

This invention relates to a conveyor belt scraper blade and to a conveyor belt scraper supporting arrangement incorporating such a blade.

Scraper blades are extensively exmployed for scraping the material carrying surfaces of conveyor belts e.g. for the transport of coal or ore, and are usually resiliently mounted with respect to the conveyor belt so that the blade does not damage fastening elements of the belt.

According to a first aspect of the present invention, there is provided a conveyor belt scraper blade, of syntehtic plastics or hard rubber material and of elongate form bonded to an elongate metallic reinforcing and/or supporting strip extending parallel to the longitudinal axis of the blade, the latter having at least one longitudinally extending scraper edge, adapted, in use, to make contact with a conveyor belt surface to be scraped, and the blade having a lateral dimension such that said at least one scraper edge extends beyond an adjacent lateral periphery of the strip, the latter being apertured at at least two places along its length to provide a connection means for attaching the blade, in use, to a blade supporting arrangement.

Preferably, the blade extends in opposite lateral directions beyond two peripheries of the strip to provide two scraper edges, the second of which may be used by reversing the blade when the first is worn out.

Preferably, the blade has a trapezoidal cross section with, in use, the longer, parallel side disposed adjacent the belt surface to be scraped. The blade may be provided with a planar end wall joining adjacent ends of the longer and shorter sides, but preferably both end walls are stepped and are each constituted by a first wall portion adjacent the longer side and located orthogonally thereto and a second wall portion joining the first portion to the shorter side.

The metallic strip is preferably of steel and this may be completely embedded within the blade, or one surface of the strip may be exposed to lie flush with the shorter side. The apertures in the strip may be tapped to receive screws to attach the blade to a supporting arrangement. Alternatively, the apertures may be plain holes with a co-axial nut located adjacent each hole on the side of the strip remote from the shorter side of the blade. The nuts may be welded to the strip prior to bonding the latter to the blade or alternatively the nuts may be "free" and maintained in their co-axial position by the material of the blade. Thus the strip may be placed in the bottom of a mould, the loose nuts co-axially aligned with the holes and liquid syntehtic plastics material poured into the mould with subsequent setting or curing of the material providing the necessary bond. A similar procedure may be employed for a strip provided with welded nuts. It is possible to provide a blade exhibiting different grades of hardness by employing different grades of plastics material e.g. to provide a relatively soft backing portion of a blade to support a relatively hard edge portion to contact the material carrying surface of the belt, or vice-versa.

According to a second aspect of the present invention, a scraper arrangement comprises a blade as defined above attached to resilient means which is, in use, attached to rigid structure of the conveyor.

The resilient means may comprise a pair of spring arms.

After wearing of one edge of the blade, the latter may be released from the supporing arrangement and reversed so as to present its other edge to the belt surface.

The invention will now be described in greater detail, by way of examples with reference to the accompanying drawings, in which.

Figure 2:
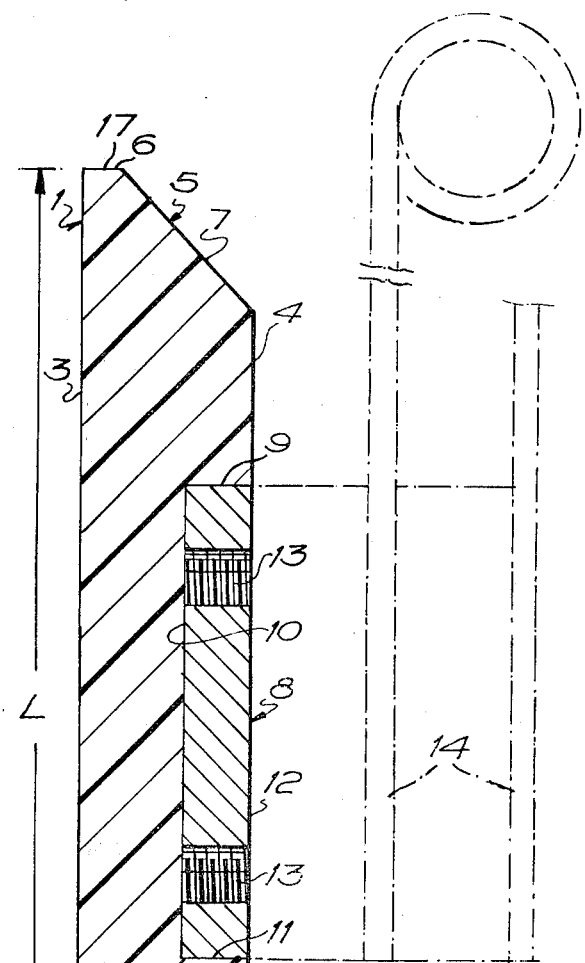
FIG. 2 is a sectional view, to a larger scale, through the blade of FIG. 1, also indicating a supporting arrangement.
Figure 3:
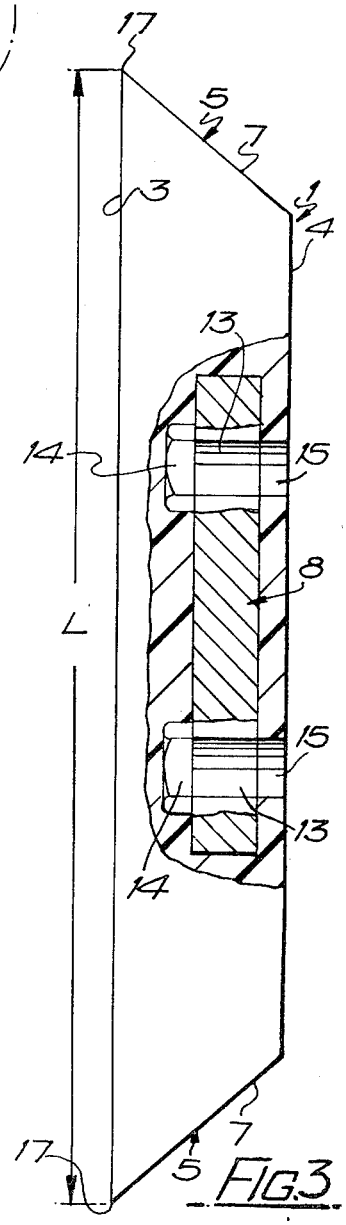

FIG. 3 corresponds generally to FIG. 2 but shows a second embodiment of blade, and FIG. 4 is a view on one side of a conveyor belt scraper supporting arrangement.

In the drawings, an elongate scraper blade 1, having a longitudinal axis 2 is of synthetic plastics material and has a trapezoidal cross-section so that its longer parallel side 3 is adapted to be disposed adjacent the belt surface (not shown) to be scraped and hence may be considered as providing a front face, while its shorter parallel side 4 may be considered as providing a rear face. End walls 5 join together the sides 3 and 4 and at the joint between walls 5 and side 3 provide two longitudinal extending scraper edges 17.

Figure 1:
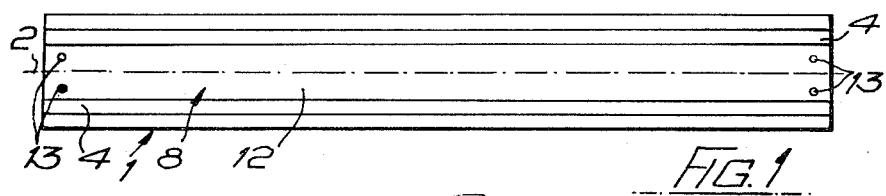
FIG. 1 is a rear elevation of a first embodiment of scraper blade in accordance with the present invention.

In the embodiment of FIG. 2 the end walls 5 each comprise a first wall portion 6 adjacent the side 3 and extending orthogonally therefrom and a second, inclined wall portion 7 joining the portion 5 to the side 3. A steel strip 8, extending parallel to the longitudinal axis 2, is bonded at faces 9, 10 and 11 to the blade 1 and in the embodiment of FIG. 2 has an exposed, rear surface 12 lying flush with the side 4. As indicated in FIG. 1, the strip 8 is provided towards each end, with a pair of spaced apertures 13 in the form of tapped holes in the embodiment of FIGS. 1 and 2. The blade 1 has a lateral dimension L such that the scraper edges 17 extend beyond the adjacent lateral periphery of the strip located at faces 9 and 11. Suitable bolts (not shown) from a blade supporting arrangement 16 indicated in chain dotted line in FIG. 2 and in full line in FIG. 4 and described in greater detail later engage the holes 13.

In the embodiment of FIG. 3, the steel strip 8 is completely embedded within the blade 1 and its apertures 13 are plain holes with each of which is co-axially aligned a nut 14 welded to the strip 8. The inclined wall portions 7 extend from the side 3 to the side 4, while holes 15 are provided between the strip 8 and the side 4 to give access to the apertures 13.

As indicated in FIG. 4, the supporting arrangement 16 is used in conjunction with a belt conveyor 18. The latter has a belt 19 which passes around a return drum 30 at the discharge end 31 of the conveyor, the drum having an axis of rotation 32. The drum 30 is supported in conventional manner from a conveyor framework (not shown), the framework also providing support for the conventional troughing idler rollers (not shown) and return rollers (not shown).

The blade 1 is located transversely to the direction of belt travel and drum rotation indicated by arrow 33 and tangentially to the return drum 30, and one edge 17 is in scraping contact with the belt 19 at a point which is approximately 10° in advance (considering the direction of drum rotation) of a horizontal line 34 passing through the axis 32 of the return drum 30. The blade 1 is supported by the arrangement 16 comprising a pair of first spring strips 35 constituting mounting strips and attached at their ends 36 one to each end of the blade 1 by screw means (not shown) via a spacer 37. At their ends 38, the first spring strips 35 are attached via pivot pins 39 to an end plate 40 in turn attached to the framework of the conveyor 18. A second pair of shorter spring strips 41 constituting damping strips are also attached at their ends 42 one to each end of the blade 1 by screw means (not shown) via a spacer 43, the first spring strips 35 and the spacer 37. Also attached to each end plate 40 is a mounting plate 44 having two apertures 45 and nuts 46 are welded to the mounting plate 44 coaxially with each aperture. Into one nut 46 at each side are screwed a first pair of adjusting bolts 47, the ends of which bear on the first spring strips 35 to enable an initial spring loading of the blade 1 on the belt 19 to be set, while into the other nuts 46 at each side are screwed a second pair of adjusting bolts 48, the ends of which bear on the second spring steel strips 41 to place a damping effect on movements of the blade 1.

What I claim is:

1. A conveyor belt scraper supporting arrangement comprising a conveyor belt scaper blade and a blade support arrangement, said conveyor belt scraper blade being of synthetic plastics or hard rubber material and of elongate form and generally trapezoidal cross-section, and including an elogate steel reinforcing and supporting strip of rectangular cross-section to provide two pairs of parallel faces extending parallel to the longitudinal axis of said blade and bonded thereto along at least three of said four faces and thereby at least partially embedded therein, said blade extending in opposite lateral directions beyond two peripheries of said strip to provide two longitudinally extending scraper edges adapted, in use, to make contact with a conveyor belt surface to be scraped, and said blade having a lateral dimension such that said scraper edges extend beyond respective adjacent lateral peripheries of said strip, said strip being apertured at at least two places along its length to provide a connection means for attaching the blade, in use, to said blade support arrangement and said blade support arrangement including resilient means for attachment of the scraper blade to rigid structure of the conveyor, said resilient means being in the form of first and second spring arms attached to said blade.

2. A scraper blade as claimed in claim 1, provided with a planar end wall joining adjacent ends of the longer and shorter sides of said generally trapezoidal cross section.

3. A scraper blade as claimed in claim 2, wherein both end walls are stepped and are each constituted by a first wall portion adjacent said longer side and located orthogonally thereto and a second wall portion joining said first wall portion to said shorter side.

4. A scraper blade as claimed in claim 1, wherein said strip is completely embedded within said blade.

5. A scraper blade as claimed in claim 1, wherein one surface of said strip is exposed to lie flush with said shorter side.

6. A scraper blade as claimed in claim 1, having a relatively soft backing portion to support a relatively hard edge portion to contact said conveyor belt surface.

7. A scraper blade as claimed in claim 1, having a relatively hard backing portion to support a relatively soft edge portion to contact said conveyor belt surface.

* * * * *